INVENTOR
Janvier F. O'Hara

United States Patent Office 3,551,003
Patented Dec. 29, 1970

3,551,003
VELOCIPEDE WITH CHAIN DRIVE
Janvier F. O'Hara, 757 Idle Hour Lane,
Sierra Madre, Calif. 91024
Filed June 6, 1968, Ser. No. 735,057
Int. Cl. B62k 19/16; B62m 1/02
U.S. Cl. 280—261                      4 Claims

ABSTRACT OF THE DISCLOSURE

A velocipede having a vehicle body made as a hollow shell and of a thermoplastic material, in which a pedal-crank axle and driven wheel axle are journalled in the shell. The roller chain interconnecting the axles and their sprockets is affected in its degree of tension by thermal rather than mechanical control means.

---

This invention relates to improvements in velocipedes having a pedal-cranked chain drive system connected to a running wheel.

It is intended that the vehicle body, whether of a simulated animal or of a farm tractor and the like, be made as a hollow shell of a thermoplastic material, as for example, of polyethlene. It is intended that the shell be primary structure in that it functions as the supporting means for the chain drive system of axles, sprockets, chain, and running wheels.

The structure described constitutes the employment of materials of unlike nature; the thermoplastic shell supports a steel roller chain. These two materials have substantial differences, as much as 10:1, in their thermal coefficients of expansion, the thermoplastic material having the higher rate of expansion. When a driving and driven axle are journalled in the shell and interconnected by sprockets and a metal roller chain, then chain tension and chain sag become considerations relevant to summer and winter outdoor exposures of the vehicle.

Vehicles of the character described and of the prior art have depended upon idler sprockets, adjusting screws, or a metal frame supporting the axles and equalizing thermal effects as means of control for chain tension. Prior art has male wheeled simulated animal riding toys employing a themoplastic animal figure in a hollow shell form, but has not carried a pedal-crank into the vehicle for lack of knowledge of a suitable means for doing so.

It is the object of this invention that thermal control means, rather than mechanical means, effect any change of axle spacing and chain tension, and as relevant to the thermal extremes of outdoor use of the vehicle.

This and other more specific objectives will appear upon reading the following specification and claims and upon considering in connection therewith the attached drawings to which they relate.

Figure 1:
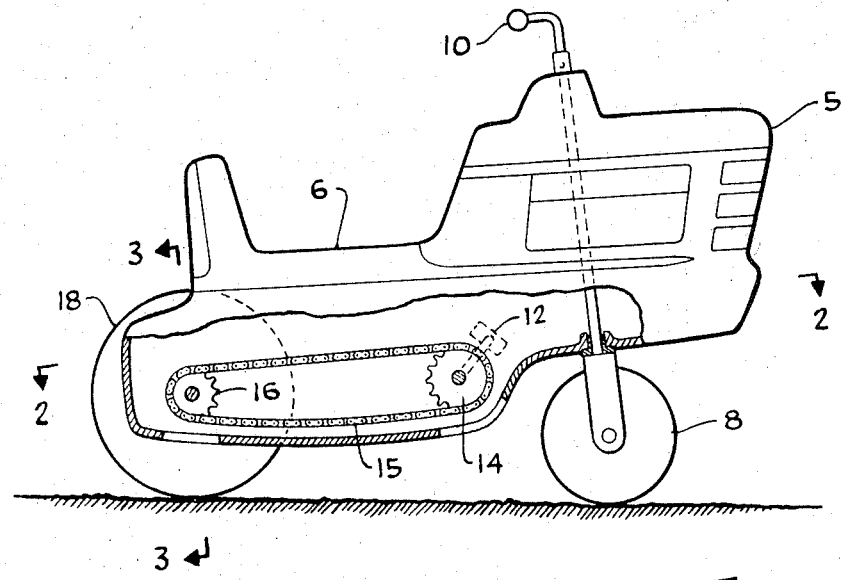
Figure 2:
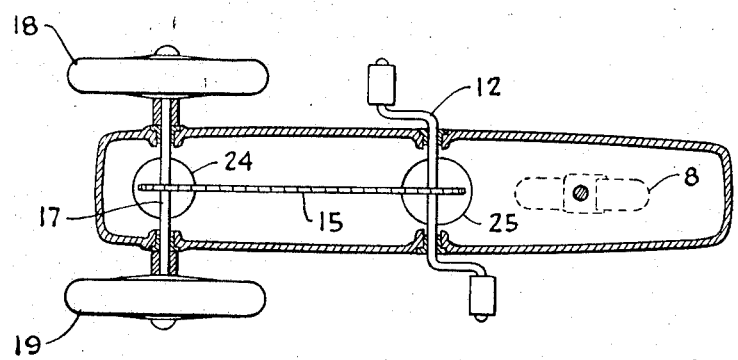
Figure 3:
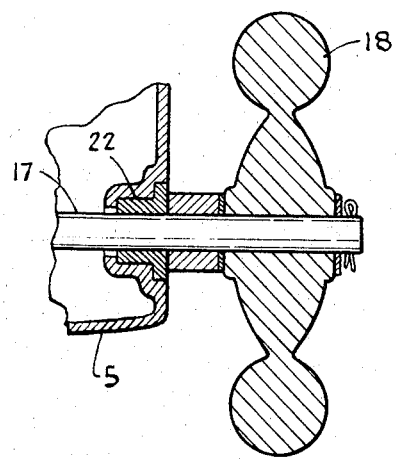

Referring to the drawings:
FIG. 1 is a cutaway view in elevation of a vehicle of the invention.
FIG. 2 is a section view of the vehicle of FIG. 1.
FIG. 3 is another section view of the vehicle of FIG. 1.

In the drawings, the vehicle is shown as comprising a vehicle body 5 made as a hollow shell, of a thermoplastic material, as for example, polyethylene, and simulating the form of a farm tractor. The vehicle body includes a riders seat 6 for occupancy of a rider who propels the vehicle. A steerable running wheel 8 is connected to the vehicle body and to a handlebar 10. A pedal-crank axle 12 is connected to a sprocket 14, roller chain 15 which is preferably made of steel, sprocket 16, axle 17, and running wheels 18, 19.

The axle 12 and 17 are journalled to the vehicle body and typically as shown in FIG. 3 for the axle 12, in which a bearing 22, preferably of nylon, is employed to reduce wear in the vehicle body. The axles however, may be journalled in the vehicle body includes openings 24, 25 for service access to the axles, sprockets, and chain.

The journalling of the axles 12 and 17 in the thermoplastic shell as described constitutes a predetermined and preset spacing of the axles; any change in tension of their interconnecting chain is relevant to the shell expansion and contraction being of a different amount than for the chain.

In a normal year-around temperature range taken outdoors and anywhere in the United States, the vehicle in public use could experience temperatures from 20 degrees F. to 120 degrees F., consideration being given to direct summer sunlight exposure as heating the vehicle body to a temperature in excess of the ambient air temperature.

In the practice of the invention, when the pitch and number of pitches of the chain are known, and the number of teeth of the sprockets are known, the spacing of the sprockets and their axles will be known, by means of prior art tables and formulas, for a taut chain condition. It is the intent of the invention that the taut chain condition be substantially reached when the vehicle has thermally stabilized at a preferred elevated temperature exposure; subsequently, exposure of the vehicle to lower temperatures will create chain slack and chain sag according to the degree of temperature decrease. At the lowest temperature preferred in the exposure of the vehicle, the chain slack and sag will have terminated and be representative of the least amount of slack and sag that would be created by the invention. If the chain were slack at the above-defined elevated temperature, the chain slack and sag would be correspondingly greater at the lowest temperature, and may reach a condition where the chain binds or separates from the sprockets. Insofar as the chain does not bind or separate from the sprockets when the vehicle is tumbled around, as it may be in public use, the machine is operable and considered acceptable to the application.

When thermal expansion of the vehicle terminates at the taut chain condition descirbed, there is no interference between the chain and vehicle body in which the vehicle body continues to expand but is restricted by the chain. The vehicle body, being the weaker of the two, would in its continuing expansion and restriction be deformed by the restriction.

In a test apparatus comprising a wood base having one fixed-position sprocket of 10 teeth and one sprocket of 14 teeth which is positionally adjustable, and a chain of ½ inch pitch and a length spacing the sprockets at 18 inch centers in the taut chain condition, it was found that at 17¹³⁄₁₆ inch sprocket spacing and tumbling of the apparatus the chain would bind with one of the sprockets. When the sprocket spacing was reduced to 17¾ inches, and the apparatus tumbled, the chain would separate from the sprockets. Similar tests may be made of other options of chain, sprockets, and sprocket spacing. The apparatus is also suitable for determining chain sag where the sag is relevant to chain clearance in the vehicle. It is preferred that a safety factor be applied to each specific vehicle construction whereby dimensional and thermal tolerances prevent the condition of chain binding, typically as in the example of the above test apparatus.

It is convenient to employ an oven of 110–120 degrees F. as simulating a reasonable outdoor exposure of summer sun, in which the vehicle may be tested for producing the taut chain condition described. Inasmuch as true sun exposure is heating only part of the vehicle body surface, and that the color of the vehicle body relates to sun heat absorption, a final proof test outdoors is preferable.

The employment of fillers and reinforcements in thermoplastic article is well known and may be applied to the invention to improve the dimensional stability of the vehicle body, the invention being effective insofar as the thermal coefficients of expansion between the vehicle body and chain are different and greater than 2.407:1. Prior art teaches of a metal or wood vehicle body in combination with a metal chain to establish a maximum ratio of 2.4066:1 between the thermal coefficients (magnesium vehicle body vs. steel chain).

The invention discloses means for spacing and journalling the driving and driven axles in a thermoplastic shell and in combination with a steel chain interconnecting the axles. These means involve the establishment of a predetermined spacing of the axles for producing a predetermined condition of chain tension and chain slack which are automatically created by changes of thermal expansion and contraction of the vehicle during public use.

I claim:

1. A velocipede comprising a vehicle body made of a thermoplastic material, a pedal-crank axle and running wheel axle journalled in substantially fixed spacial relationship with each other in the vehicle body, and suitable sprockets and a metal roller chain interconnecting the axles, thermal expansion of said body at elevated temperatures increasing the relative spacing of said axles to cause said chain to be substantially taut.

2. A velocipede in accordance with claim 1 wherein the vehicle body is made as a hollow shell.

3. A velocipede comprising a vehicle body made of a thermoplastic material, a pedal-crank axle and running wheel axle journalled in substantially fixed spacial relationship with each other in the vehicle body, and suitable sprockets and a metal roller chain interconnecting the axles, the chain being in a substantially taut condition when the velocipede is exposed outdoors to direct summer sun and to a condition of stabilized thermal expansion of the vehicle body.

4. A velocipede in accordance with claim 3 wherein the vehicle body is made as a hollow shell.

References Cited

UNITED STATES PATENTS

| | | | |
|---|---|---|---|
| 1,827,350 | 10/1931 | Boderek | 280—261 |
| 2,797,105 | 6/1957 | Douglas et al. | 280—282 |
| 2,814,524 | 11/1957 | Porsche et al. | 296—31 |
| 3,023,045 | 2/1962 | Cirami | 296—31 |
| 3,039,791 | 6/1962 | Horowitz et al. | 280—282X |
| 3,151,872 | 10/1964 | Weber | 280—1.11 |
| 3,233,916 | 2/1966 | Bowden | 280—274 |

KENNETH H. BETTS, Primary Examiner

U.S. Cl. X.R.

74—242.11; 280—1.11, 2.82